Nov. 18, 1952     H. W. ALDEN     2,618,359
LUBRICATING MEANS FOR AXLE DRIVE MECHANISMS
Original Filed Sept. 19, 1941     2 SHEETS—SHEET 1

Inventor
Herbert W. Alden

By Strauch & Hoffman
Attorneys

Nov. 18, 1952     H. W. ALDEN     2,618,359
LUBRICATING MEANS FOR AXLE DRIVE MECHANISMS
Original Filed Sept. 19, 1941     2 SHEETS—SHEET 2
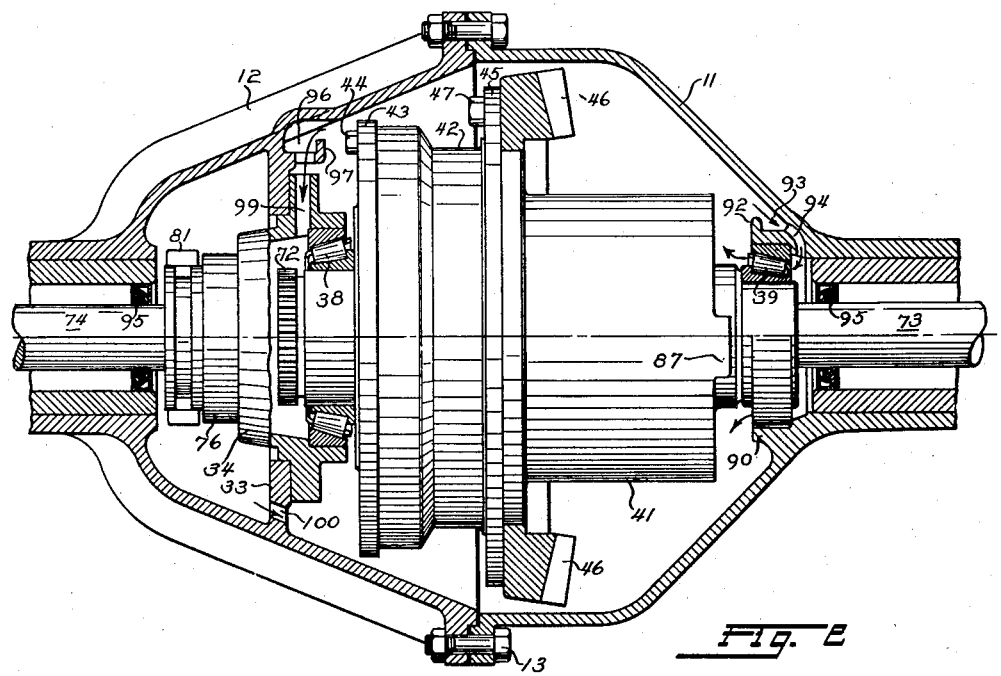
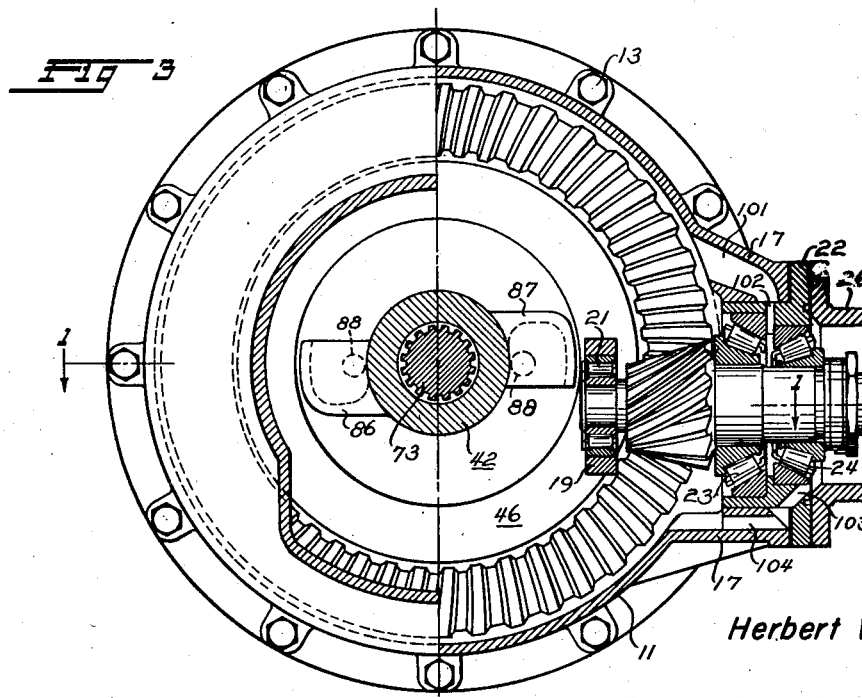
Inventor
Herbert W. Alden
By Strauch & Hoffman
Attorneys Patented Nov. 18, 1952

2,618,359

UNITED STATES PATENT OFFICE 2,618,359

LUBRICATING MEANS FOR AXLE DRIVE MECHANISMS

Herbert W. Alden, Detroit, Mich., assignor to The Timken-Detroit Axle Company, Detroit, Mich., a corporation of Ohio Original application September 19, 1941, Serial No. 411,602. Divided and this application July 31, 1947, Serial No. 765,098

2 Claims. (Cl. 184—11)

1

This invention relates to lubricating means for axle drive mechanisms, the subject matter of the present application constituting a division of my application Serial No. 411,602, filed September 19, 1941, and issued June 22, 1948, as United States Letters Patent No. 2,443,590.

It is the primary object and purpose of the invention to provide simple and efficiently functioning means for maintaining a substantially continuous circulation of lubricating oil under centrifugal force within an axle housing upon the various relatively movable parts of the axle drive mechanism.

A more particular object of the invention resides in the provision of a rotor journalled in the axle housing and enclosing the essential parts of a differential unit and power transfer gearing, together with means carried by said rotor and effective in the rotation thereof, to create an axial flow of lubricating oil contained in the housing through said rotor and upon the various parts of the differential unit and transfer gearing therein.

A further object is to provide means for insuring a copious supply of oil to the journal bearings for the rotor and the pinion drive shaft which is geared thereto.

With the above and other subordinate objects in view, the invention comprises the improved lubricating means for axle drive mechanisms and the construction and the relative arrangement of its several parts, as will hereinafter be more fully described, illustrated in the accompanying drawings and subsequently incorporated in the subduing claims.

In the drawings wherein similar reference characters designate corresponding parts throughout the several views:

Figure 2 is a vertical sectional view taken substantially on the line 2—2 of Figure 1, the rotor of the drive mechanism being shown in elevation; and Figure 3 is a vertical sectional view taken substantially on the line 3—3 of Figure 1.

Figure 1:
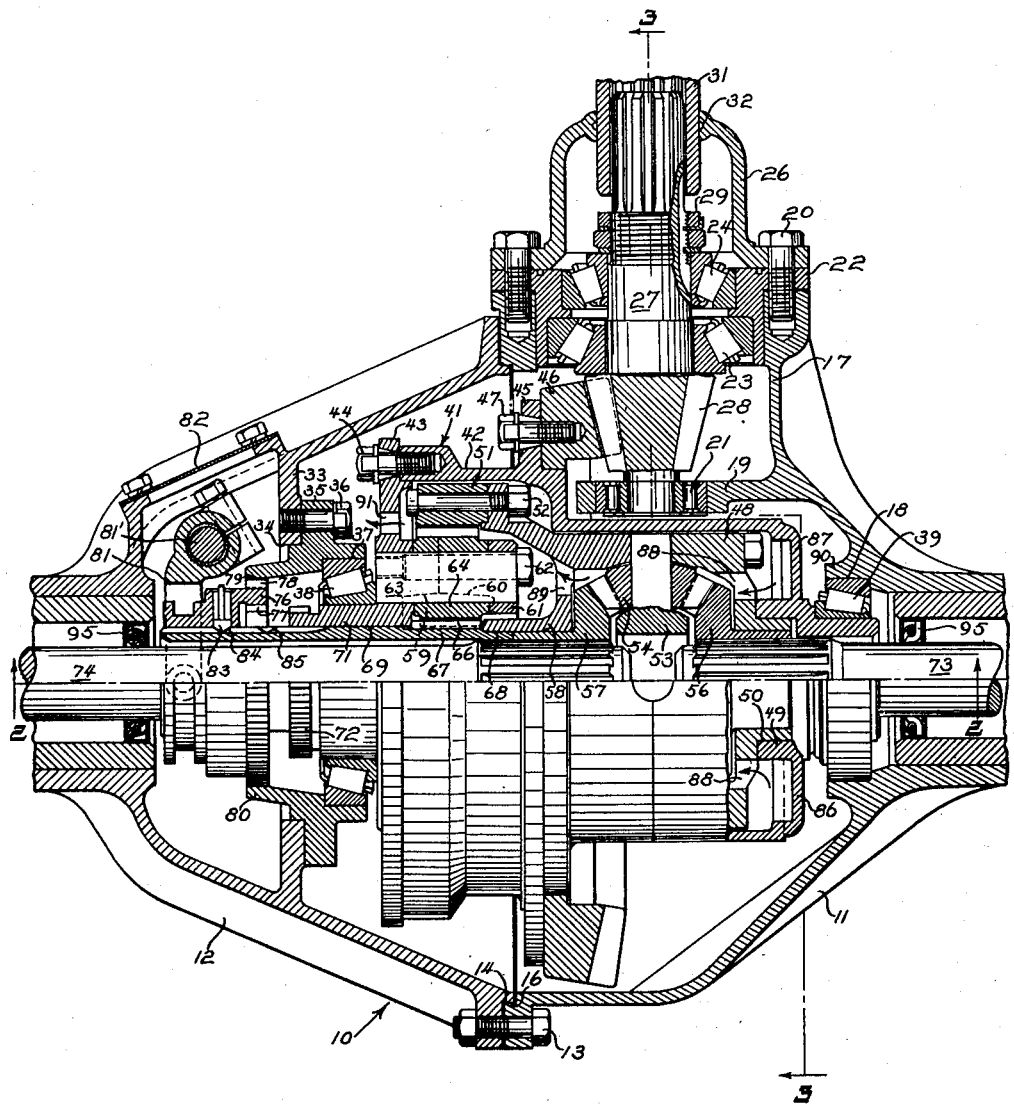
Figure 1 is a horizontal section through the axle housing, taken substantially on the line 1—1 of Figure 3, certain parts of the drive mechanism being shown in elevation.

Referring in further detail to the drawings, in which I have shown one type of differential and power transfer gearing, the axle construction comprises a housing, indicated generally at 10, including main housing section 11 and auxiliary housing section 12. The housing sections are joined together by bolts 13 and held in aligned

2 relationship by a piloting shoulder 14 and a piloting recess 16. Main housing section 11 has a radially extending boss 17 and an inwardly extending bearing recess 18. Extending from a wall of housing member 11 is web 19 which supports bearing 21, and a bearing carrier 22 is received in an opening in boss 17.

Carrier 22 supports taper roller bearings 23 and 24 and a cap 26 is mounted over the carrier, the whole assembly being secured to boss 17 by bolts 20 as shown. A pinion shaft 27, carrying at its inner end a pinion 28, is journalled in bearings 21, 23 and 24, and a lock nut assembly 29 is threaded on the shaft for adjusting bearings 23 and 24. The shaft is splined for connection to a universal joint part 31 which fits snugly in cap 26, sealing means 32 being provided to prevent the escape of lubricant from the axle housing in well known manner.

Housing member 12 is provided with a transverse rib or web member 33, bored to provide seat 34 for a combined bearing carrier member and clutch locking element 35, secured to web 33 by screw 36. Element 35 is formed with bearing recess 37 to receive the outer race of taper roller bearing 38, and a similar taper roller bearing 39 is mounted within recess 18 in the boss 90 and aligned with bearing 38.

The axle drive mechanism includes a rotor or housing member indicated generally by the reference numeral 41 is journalled at one end within the bearing 39. This housing member comprises a main housing section 42 and a cover element 43, secured to section 42 by screws 44. Housing section 42 is provided with a radially extending flange 45 against which is secured ring gear 46 by means of screws 47.

A differential carrier member 48 is journalled at its right-hand end within a cylindrical extending portion 49 of housing section 42, providing a bearing 50. To the other end of carrier 48 is secured an internal ring gear 51 by means of bolts 52. Carrier 48 is split in a conventional manner and provided with a yoke 53 on which differential pinions 54 are journalled. Pinions 54 mesh with side gears 56 and 57, respectively, side gear 56 being journalled within the right-hand end of carrier 48 and side gear 57 being journalled in a left-hand cylindrical extension 58 of said carrier. As will be observed, extension 58 projects beyond the end of side gear 57, the purpose of which will be pointed out later.

Cover element 43, adjacent its inner portion, is provided with a circular series of bosses 59 and seated on these bosses is a corresponding series of bosses 60 carried by a ring member 61. Screws 62 pass through the bosses and are threaded into cover element 43, so as to tightly secure ring element 61 to cover element 43. Ring 61 and cover member 43 are provided with aligned bores into which pins 63 are pressed. These pins provide trunnion elements on which planet gears 64 are journalled.

Planet gears 64 are preferably three in number equally spaced and mesh with sun gear teeth 66 integrally formed in an elongated sleeve member 67. The sleeve is journalled at its inner end 68 in a cylindrical aperture provided in the extension 53 of differential carrier 48. At its other end sleeve 67 is journalled within cylindrically extending portion 71 of the sleeve to cover 43. Beyond bearing 38, extension 71 is provided with a circular series of external clutch teeth 72. Axle shafts 73 and 74 are splined to side gears 56 and 57 in the usual manner, shaft 74 extending through sleeve 67.

A longitudinally slidable clutch element provided with internal teeth 77, and external teeth 78, is splined to sleeve 67. In the position shown, external teeth 78 mesh with a series of internal clutch teeth 79 formed on a laterally extending portion 80 of the combined bearing carrier and clutch locking element 35. The clutch element is controlled by a clutch yoke 81 mounted on a shaft 81' journalled in the housing element 12, a cover 82 being provided to afford access to these parts. Clutch element 76 is provided with a spring-pressed detent 83 adapted to selectively engage either one of two locating recesses 84 or 85 as will be readily understood. When the clutch is shifted to the right as seen in Figure 1 so that detent 83 engages recess 85, internal clutch teeth 77 will then intermesh with clutch teeth 72 on a cover extension 71.

Housing element 42 is provided, on its small diameter end enclosing the differential unit, with two oppositely extending scoop members 86 and 87. As can be more readily seen from a comparison of Figures 1 and 3, these scoop elements open in the direction of rotation of the housing member, and lead directly to the interior of differential housing member 42. Carrier 48 is provided with lubricant bores 88 and 89. Cover 43 closing the large diameter end of the housing has formed therein a lubricant discharge port 91 (Figure 1) radially spaced from the housing axis a greater distance than scoop members 86 and 87. At its top the axially directed boss 90 is formed with a rib 92 providing recess 93, leading from which is duct 94 communicating with outer side of bearing 39. To prevent oil from escaping out of the ends of the axle housing, oil seals 95 may be provided. However, due to the pumping action of the bearing 39, there will be very little tendency for oil to escape at this point, and oil seals 95 may be dispensed with, if desired. At its upper portion web 33 is formed with a recess 96 and rib 97. Duct 99 leads to bearing 38 and also to clutch elements 72, 77, 78 and 79. A lubricant return duct 100 is arranged at the lowermost part of web 33.

Referring now to Figure 3, it will be observed that the extending boss 17 is provided with a duct or passage 101 above the bearings 23 and 24. Duct 102 through bearing carrier 22 leads to a point between these bearings, and ducts 103 and 104 are provided to conduct lubricant passing forwardly through the bearing 24 back into the housing 10.

Although the operation of the selected example of power transfer gearing should be obvious from the foregoing description of its construction, it is briefly as follows:

Power is supplied to the main housing 41 through ring gear 46 and pinion 28 in the usual manner. With clutch element 76 is the position shown in Figure 1, sleeve 67 is locked against rotation with respect to housing member 12. Thus, when housing 41 is driven by pinion 28 and ring gear 46, planet gears 64 will be rotated by means of sun gear teeth 66 on sleeve 67 and as gears 64 mesh with ring gear 51, the ring gear 51, together with carrier 48, will be driven also. Due to the relative size of planet gears 64 and sun gear teeth 66 on sleeve 67, the ring gear 51 will be driven at a greater speed than that of the housing element 41. In other words, an "overdrive" is provided with this setting of the clutch sleeve 76.

If clutch sleeve 76 is shifted to the right as viewed in Figure 1, the internal teeth 77 mesh with teeth 72 carried by extension 71 of differential housing 41. Thus the sleeve 67 is locked to the housing 41 and consequently the planetary gearing is locked together, and ring gear 51, together with differential carrier 48, is driven at the same speed as the outer or main ring gear 46. This provides the direct low speed drive of the axle.

Turning now to the lubrication of the axle construction, the housing 10, formed by elements 11 and 12, is filled with oil to a level somewhat above the lower portion of the bearing 38 so that the level stands well above one of the scoops 86 and 87 when they are in upright position, that is, at right angles to the position shown in Figure 3. Accordingly, as the housing 41 rotates, these scoops dip into the oil and force it through apertures 88 and 89 in the differential carrier 48. As will be observed, the size of the carrier 48 increases to the left as does the size of the differential housing 41. Therefore, as the rotation of these parts proceeds, the oil taken in through ducts 88, 89 will be forced, by centrifugal force, axially through these elements, some of this lubricant will pass directly through the differential gearing 54, 56 and 57, then, discharging through ports 89, and traveling outwardly between the planetary gear 64 and the ring gear 51, will be eventually discharged through ports 91. Some of this oil will, of course, travel on the outside of the carrier 48 and eventually be discharged through the same ports 91. Thus, all of the moving parts of the planetary gearing as well as the differential gearing are at all times supplied with lubricant which is being continually forced through the differential and planetary gearing assembly by the action of centrifugal force.

Referring now to Figure 2, the oil which is picked up by the ring gear 46 will be thrown around in the axle housing some of which will collect on the upper portion thereof, and as it runs down the inclined walls of housing members 11 and 12, will be collected by the recesses 93 and 96, and eventually discharged through ducts 94 and 99 into the bearings 38 and 39. Due to the conical character of these bearings, this oil, or most of it, will be pumped inwardly through these bearings and discharged into the housing. Thus, a continuous circulation of oil through these bearings is provided. It will also be seen that at least some of the oil discharged by the bearing 38 will be within the path of the scoops 86 and 87 and will be collected thereby and taken within differential housing 41. Also, some of the oil, discharged from duct 99, will reach the clutch parts 72, 76 and 79.

Turning to Figure 3, oil, which is picked up by the ring gear 46, will be discharged on the upper periphery of the inside of the housing elements 11 and 12, and as it drains downwardly thereon, will enter into recess 101 from which it will pass through ports 102 to bearings 23 and 24. Oil entering between these bearings will be pumped outwardly thereby, that passing through bearing 23 being discharged directly back within the axle housing while that discharged by bearing 24 will be collected within the cover or cap 26 and eventually discharged back through ports 103 and 104 into the axle housing, as will be readily understood. Thus, it will be seen that all of the moving parts of my improved axle construction are continuously provided with large quantities of oil. Also, the oil, continuously circulated through the housing, is cooled by contact with the walls thereof thereby reducing the temperature of the various operating parts. It will also be observed that the oil fed axially through the differential housing and differential carrier 48 is acted on by centrifugal force, while oil led to gearings 38, 39 and 23 and 24 is under the action of gravity. Thus, at all times during operation of the axle, a positive force tends to circulate lubricant through all of the moving parts, and at no time is it necessary for lubricant to travel opposite to centrifugal force or against gravity in order to reach the parts requiring lubrication. Accordingly, adequate lubrication is assured and proper operation and increased life of the parts is secured. Preferably bores 88 and 89 and passage 91 are located at increased distances from the rotational axis, as shown, to augment the feeding of lubricant through housing 41 and carrier 48.

From the foregoing, it will be seen that I have provided simple and reliably functioning means for automatically maintaining, during operation of the differential and power transfer gearing, a continuous centrifugally induced axial flow of the lubricant contained in the axle housing and the circulation thereof in copious volume to all relatively moving parts of the mechanism. Wear is reduced to a minimum and maximum efficiency in the transmission of driving torque to the vehicle axles is realized. It will, of course, be understood that the above described example of power transfer gearing is merely illustrative, and my present improvements can be utilized with equal advantage in connection with other transfer mechanisms, of either the single or multiple speed type.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An axle housing adapted to contain a body of lubricant; drive axles associated with said housing; means for driving said axles including differential mechanism and power transfer gearing; a second housing rotatably supported in said axle housing and surrounding said differential mechanism; lubricant collecting means on said second housing adjacent one end thereof for collecting lubricant from said axle housing and directing it into said second housing onto said differential mechanism; means associated with said differential mechanism providing inlet and outlet ducts; said inlet duct being arranged adjacent said collecting means and said outlet duct being arranged adjacent said power transfer gearing; and lubricant discharge means on said second housing; said inlet duct, outlet duct and discharge means each being spaced at increased distances from the rotational axes of said second housing, in the order named, whereby lubricant directed into said second housing is continuously fed through said differential mechanism, power transfer gearing and back into said axle housing.

2. An axle housing; a rotor journalled in said housing; a differential carrier journalled in said rotor and carrying differential gearing; an enlarged portion on said carrier; power transfer gearing mounted on said rotor and meshing with a gear on said enlarged portion; means on said rotor for collecting and feeding lubricant from the axle housing into said rotor; inlet and outlet passages on said carrier and a discharge passage on said rotor; said differential gearing being arranged between said inlet and outlet passages and said power transfer gearing being interposed between said outlet passage and said discharge passage, whereby lubricant collected by said collecting means is forced through said rotor, differential gearing and power transfer gearing.

HERBERT W. ALDEN.

REFERENCES CITED

The following references are of record in the file of this patent:

UNITED STATES PATENTS

| Number | Name | Date |
| --- | --- | --- |
| 2,015,108 | Harper | Sept. 24, 1935 |
| 2,037,173 | Matthews | Apr. 14, 1936 |
| 2,178,900 | Starr | Nov. 7, 1939 |
| 2,237,900 | Bundy | Apr. 8, 1941 |
| 2,336,513 | Taylor | Dec. 14, 1943 |